US011153935B2

United States Patent
Lee et al.

(10) Patent No.: US 11,153,935 B2
(45) Date of Patent: Oct. 19, 2021

(54) LATCHING THERMOSTATS FOR REDUNDANT HEATING

(71) Applicant: Goodrich Corporation, Charlotte, NC (US)

(72) Inventors: Charles A. Lee, Akron, OH (US); Sabeshan Sean Periyathamby, Copley, OH (US)

(73) Assignee: Goodrich Corporation, Charlotte, NC (US)

( * ) Notice: Subject to any disclaimer, the term of this patent is extended or adjusted under 35 U.S.C. 154(b) by 533 days.

(21) Appl. No.: 15/983,835

(22) Filed: May 18, 2018

(65) Prior Publication Data

US 2018/0368211 A1     Dec. 20, 2018

Related U.S. Application Data

(60) Provisional application No. 62/519,911, filed on Jun. 15, 2017.

(51) Int. Cl.
*H05B 1/02* (2006.01)
*B64D 15/12* (2006.01)
*B64D 15/22* (2006.01)

(52) U.S. Cl.
CPC ........... *H05B 1/0236* (2013.01); *B64D 15/12* (2013.01); *B64D 15/22* (2013.01); *H05B 2203/037* (2013.01)

(58) Field of Classification Search
None
See application file for complete search history.

(56) References Cited

U.S. PATENT DOCUMENTS

| | | | |
|---|---|---|---|
| 3,612,143 A | 10/1971 | Ungerer | |
| 4,216,554 A | 8/1980 | Glueckert et al. | |
| 4,635,668 A * | 1/1987 | Netter | E03B 7/12 137/392 |
| 4,724,504 A * | 2/1988 | Prouty | H01H 43/308 361/165 |
| 4,853,607 A * | 8/1989 | Walter | H02J 7/0091 320/154 |
| 4,963,884 A * | 10/1990 | Kiguchi | B41J 2/38 347/185 |
| 5,488,218 A * | 1/1996 | Olsen | G05D 23/1951 219/492 |
| 5,821,503 A * | 10/1998 | Witt | A21B 1/48 219/388 |

(Continued)

FOREIGN PATENT DOCUMENTS

JP      56118562 A *  9/1981 ............ F02P 5/1558

*Primary Examiner* — Ibrahime A Abraham
*Assistant Examiner* — Gyounghyun Bae
(74) *Attorney, Agent, or Firm* — Kinney & Lange, P.A.

(57) ABSTRACT

Redundant heating systems include a plurality of heating circuits to heat a region. Heating circuits include a temperature sensor to sense a temperature of the region, a heating element, a temperature controller to provide power to the heating element based on the sensed temperature of the region, and a latching thermostat in series with the heating element. The latching thermostat consumes power supplied by the temperature controller to the heating element in response to a temperature of the latching thermostat reaching an open latch threshold temperature.

7 Claims, 7 Drawing Sheets

(56) References Cited

U.S. PATENT DOCUMENTS

| | | | | |
|---|---|---|---|---|
| 6,313,690 | B1* | 11/2001 | Ohshima | H03K 17/0822 |
| | | | | 323/283 |
| 8,183,835 | B2* | 5/2012 | Takeda | H02J 7/0029 |
| | | | | 320/134 |
| 9,674,897 | B1* | 6/2017 | Bellig | H05B 1/0236 |
| 2006/0250145 | A1* | 11/2006 | Kobbe | G01R 27/14 |
| | | | | 324/691 |
| 2009/0001819 | A1* | 1/2009 | Kondo | B41J 2/04581 |
| | | | | 307/117 |
| 2011/0280596 | A1* | 11/2011 | Shimura | G03G 15/5004 |
| | | | | 399/33 |
| 2013/0263926 | A1 | 10/2013 | Stellmacher et al. | |
| 2013/0320926 | A1* | 12/2013 | Kerfoot, Jr. | H01M 10/44 |
| | | | | 320/117 |
| 2017/0077656 | A1* | 3/2017 | Beideman | H01R 13/7137 |

\* cited by examiner

LATCHING THERMOSTATS FOR REDUNDANT HEATING

CROSS REFERENCE TO RELATED APPLICATION(S)

This application claims the benefit of U.S. Provisional Application No. 62/519,911 filed Jun. 15, 2017, for "LATCHING THERMOSTATS FOR REDUNDANT HEATING" by Charles A. Lee and Sabeshan Sean Periyathamby, which is incorporated herein by reference in its entirety.

BACKGROUND

This disclosure relates generally to temperature control for heating systems. More particularly, this disclosure relates to redundant heating systems. Redundant heating systems are used to heat regions that can be rendered inoperative or even damaged by low ambient temperatures. For example, aircraft are often subject to freezing temperatures and various aircraft systems are temperature sensitive. One such aircraft system is a drain mast, which must be heated to prevent freezing of liquids. A heating system failure can render a drain mast inoperative in freezing ambient temperatures.

SUMMARY

A redundant heating system comprises a plurality of heating circuits configured to heat a region. Each heating circuit comprises a temperature sensor, a heating element, a temperature controller, and a latching thermostat in series with the heating element. The temperature sensor is configured to sense a temperature of the region. The temperature controller is configured to provide power to the heating element based on the sensed temperature of the region. The latching thermostat is configured to consume power supplied by the temperature controller to the heating element in response to a temperature of the latching thermostat reaching an open latch threshold temperature.

A method comprises sensing a temperature of a region using a plurality of temperature sensors; providing power, using at least one temperature controller, to at least one heating element based on the sensed temperature of the region; and consuming power provided by the at least one temperature controller using at least one latching thermostat, in response to a temperature of the latching thermostat reaching an open latch threshold temperature.

DETAILED DESCRIPTION

Figure 1:
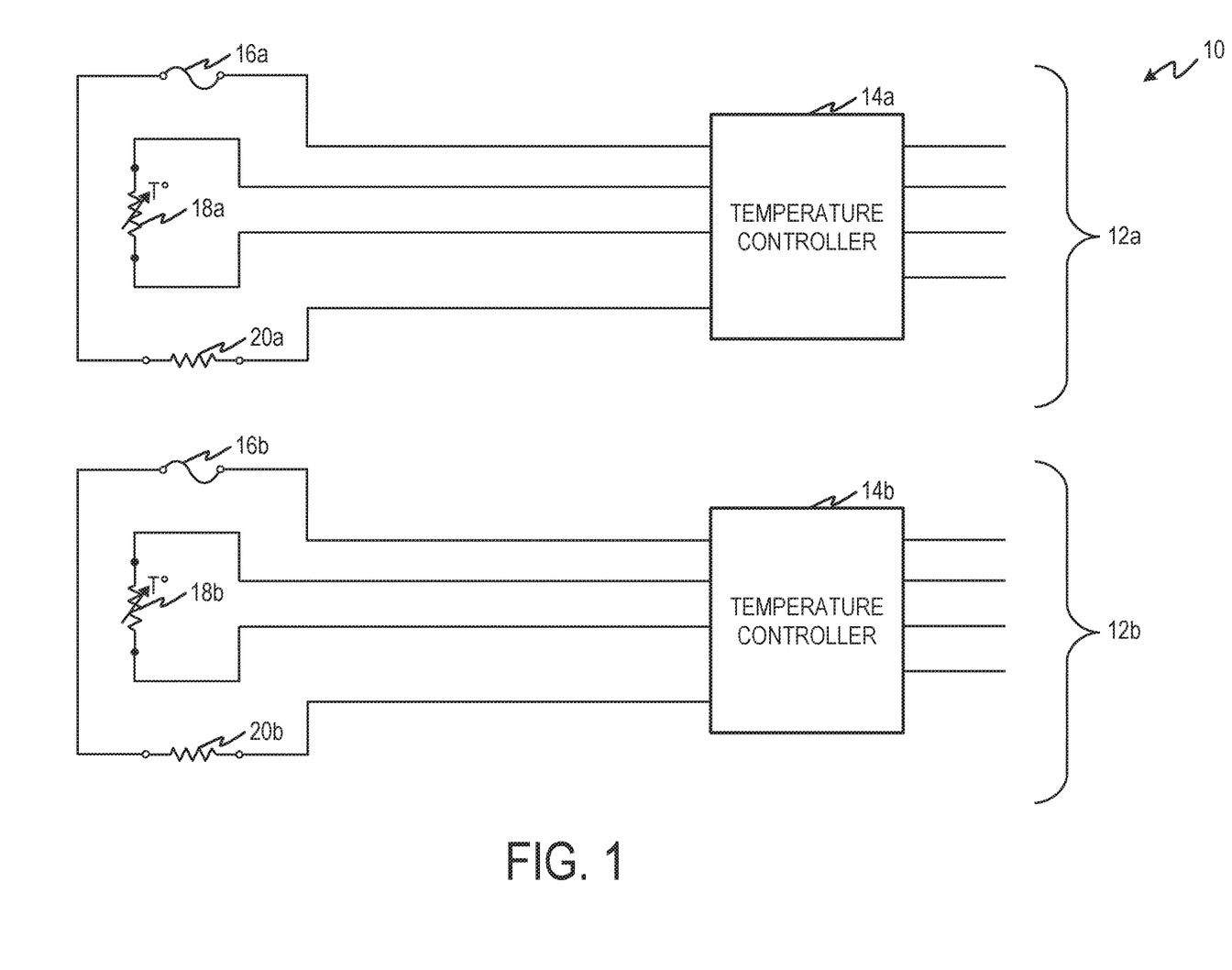
FIG. 1 is a schematic diagram of a redundant heating system as known in the prior art.

FIG. 1 is a schematic diagram of redundant heating system 10 including heating circuits 12*a* and 12*b*. Heating circuits 12*a* and 12*b* include temperature controllers 14*a* and 14*b*, thermal cutoffs 16*a* and 16*b*, temperature sensors 18*a* and 18*b*, and heating elements 20*a* and 20*b*, respectively.

Heating circuit 12*a* is configured to heat and maintain a temperature of a region within a temperature range. Temperature controller 14*a* receives a command signal indicating the temperature range to be maintained. Temperature controller 14*a* receives a sensor signal from temperature sensor 18*a*. Temperature sensor 18*a* senses the temperature of the region and provides the sensor signal to temperature controller 14*a*. The sensor signal corresponds to the sensed temperature of the region. Temperature controller 14*a* determines if the sensed temperature is below a lower limit of the temperature range using the sensor signal and the received temperature range. Temperature controller 14*a* is configured to begin providing power to heating element 20*a* when the temperature is at or below the lower limit of the temperature range. Temperature controller 14*a* is configured to cease providing power to heating element 20*a* when the sensed temperature is at or above an upper limit of the temperature range.

Heating circuit 12*a* includes thermal cutoff 16*a* in series with heating element 20*a* for overheat protection. Thermal cutoff 16*a* is configured to open when the temperature reaches a thermal cutoff threshold temperature. The connection from temperature controller 14*a* to heating element 20*a* is broken in response to thermal cutoff 16*a* opening. Temperature controller 14*a* can no longer provide power to heating element 20*a* and heating circuit 12*a* can no longer heat or maintain the temperature of the region. Heating circuit 12*a* becomes inoperable until thermal cutoff 16*a* is replaced.

Heating circuit 12*b* is substantially similar to heating circuit 12*a*. However, heating circuit 12*b* is configured with a lower temperature range than the temperature range of heating circuit 12*a*. Heating circuit 12*b* is a redundant heating circuit configured with the lower temperature range so that it can take over heating and maintaining the temperature of the region should heating circuit 12*a* fail. However, if either heating circuit 12*a* or 12*b* fails in a power stuck on condition, the temperature of the region will continue to rise until both thermal cutoffs 12*a* and 12*b* open in response to the temperature reaching the thermal cutoff temperature. Both heating circuits 12*a* and 12*b* will become inoperable in response to thermal cutoffs 12*a* and 12*b* opening. This will cause the temperature of the region to fall to the ambient temperature, which may cause damage to the region.

Figure 2:
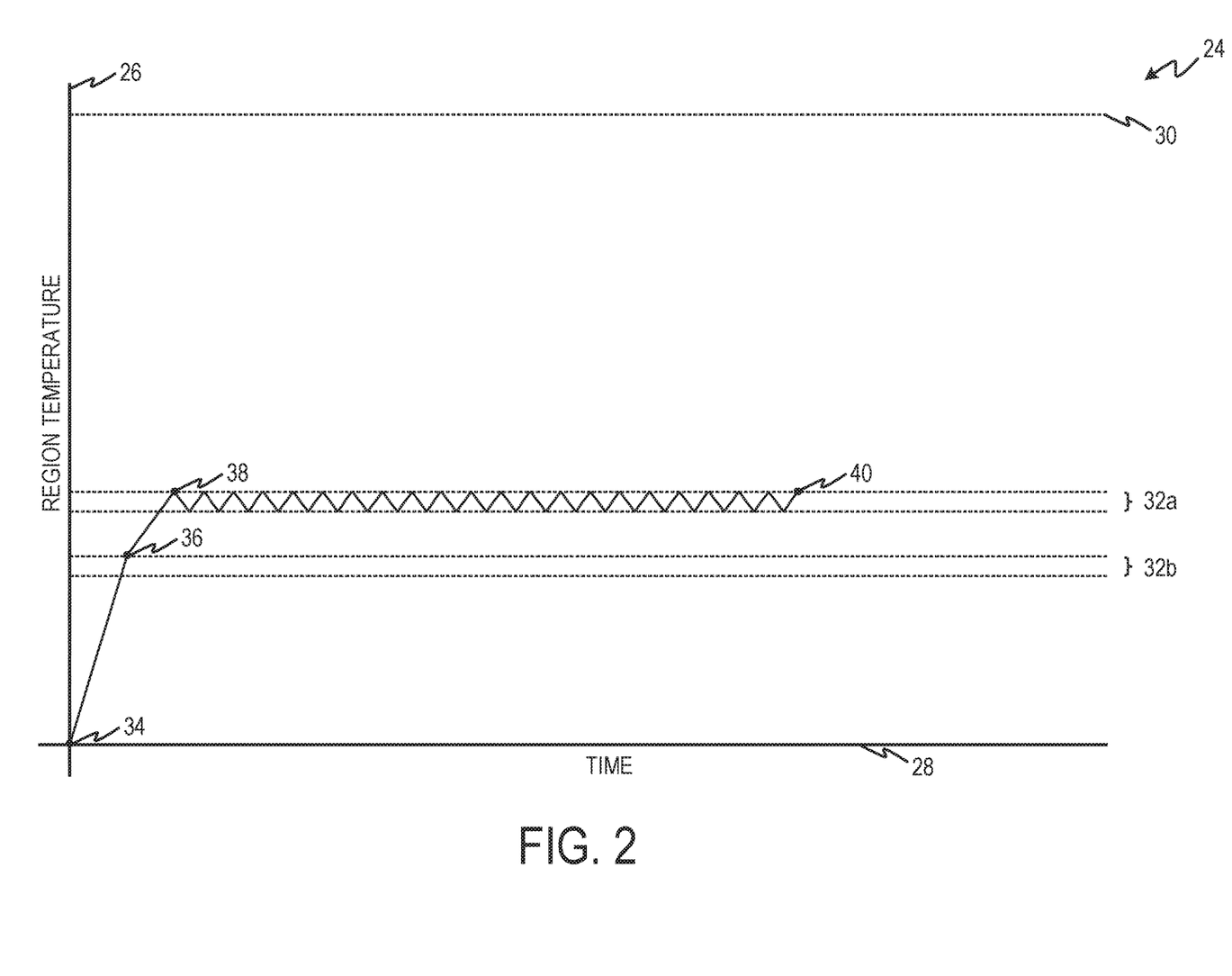
FIG. 2 is a graph illustrating normal operation of the redundant heating system known in the prior art.

FIG. 2 is graph 24 illustrating a temperature of a region over time by properly working redundant heating system 10 known in the prior art. Graph 24 plots temperature on y-axis 26 and time on x-axis 28. Graph 24 includes thermal cutoff temperature 30, temperature control range 32*a* corresponding to heating circuit 12*a*, temperature control range 32*b* corresponding to heating circuit 12*b*, and points 34, 36, 38, and 40.

At point 34, power is applied to heating circuits 12a and 12b. From point 34 to point 36, both heating circuits are on, temperature controllers 14a and 14b are providing power to heating elements 20a and 20b causing heating circuits 12a and 12b to provide heat that raises the temperature of the region. At point 36, temperature controller 14b ceases providing power to heating element 20b in response to the temperature reaching the upper limit of temperature control range 32b. From point 36 to point 38, heating circuit 12a continues to provide heat and raise the temperature of the region. At point 38, temperature controller 14a ceases providing power to heating element 20a in response to the temperature reaching the upper limit of temperature control range 32a. From point 38 to point 40, heating circuit 12a turns on and off to maintain the temperature of the region within temperature control range 32a. Temperature controller 14a ceases to provide power to heating element 20a when the temperature reaches the upper limit of temperature control range 32a, and resumes providing power to heating element 20a when the temperature reaches a lower limit of temperature control range 32a. This process will be maintained until power ceases to be applied to heating circuits 12a and 12b.

Figure 2A:
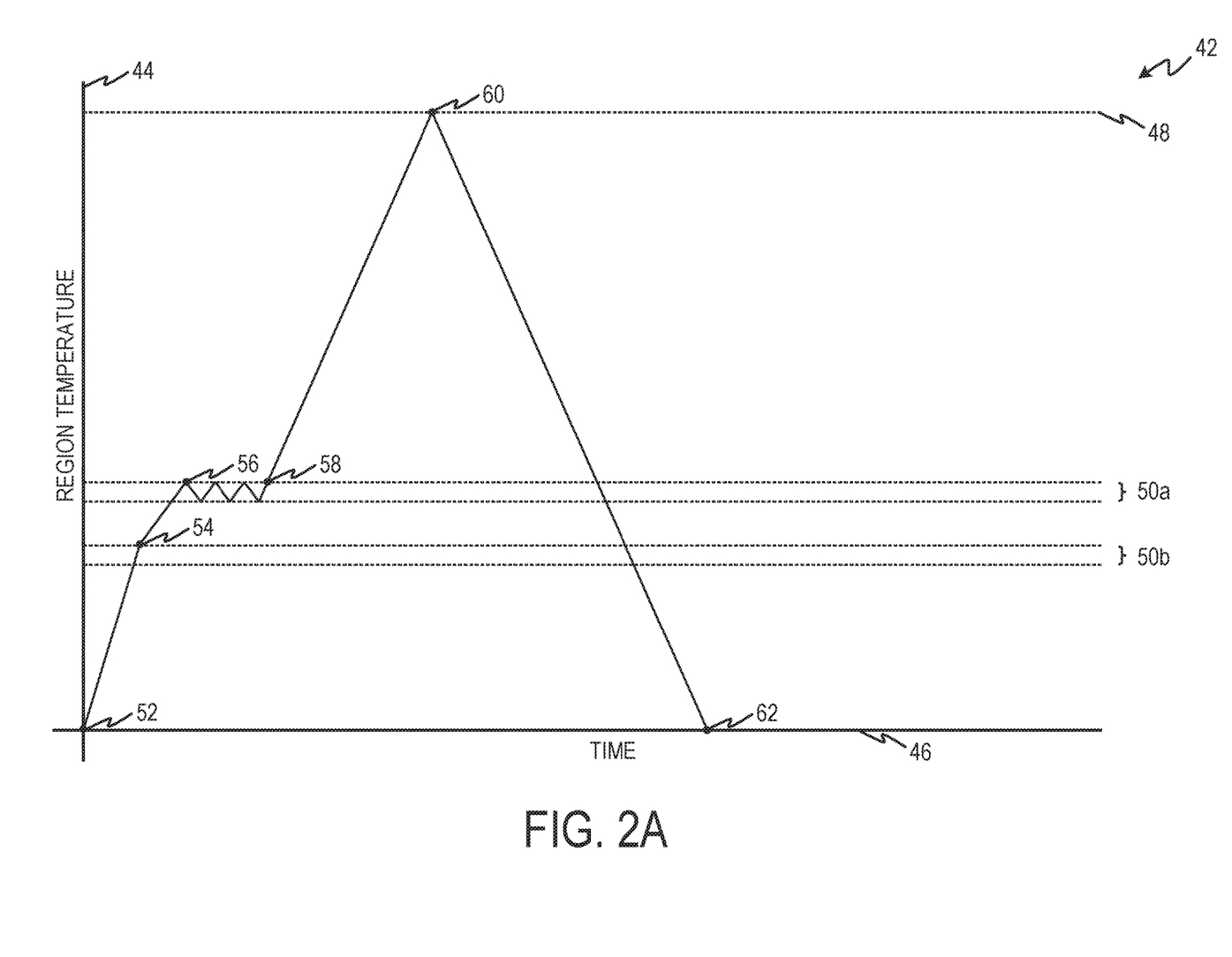
FIG. 2A is a graph illustrating one example of a stuck on failure of the redundant heating system known in the prior art.

FIG. 2A is graph 42 illustrating a temperature of a region over time when heating circuit 12a of redundant heating system 10 fails in a stuck on condition. Graph 42 plots temperature on y-axis 44 and time on x-axis 46. Graph 24 includes thermal cutoff temperature 48, temperature control range 50a corresponding to heating circuit 12a, temperature control range 50b corresponding to heating circuit 12b, and points 52, 54, 56, 58, 60, and 62.

From point 52 to point 58, the temperature of the region proceeds normally as previously described for FIG. 2. At point 52, power is applied to heating circuits 12a and 12b. From point 52 to point 54, both heating circuits are on, temperature controllers 14a and 14b are providing power to heating elements 20a and 20b causing heating circuits 12a and 12b to provide heat that raises the temperature of the region. At point 54, temperature controller 14b ceases providing power to heating element 20b in response to the temperature reaching the upper limit of temperature control range 50b. From point 54 to point 56, heating circuit 12a continues to provide heat and raise the temperature of the region. At point 56, temperature controller 14a ceases providing power to heating element 20a in response to the temperature reaching the upper limit of temperature control range 50a. From point 56 to point 58, heating circuit 12a maintains the temperature of the region within temperature control range 50a by temperature controller 14a ceasing to provide power to heating element 20a when the temperature reaches the upper limit of temperature control range 50a and temperature controller 14a resumes providing power to heating element 20a when the temperature reaches a lower limit of temperature control range 50a.

Points 58, 60, and 62 illustrate the temperature of the region over time during a stuck on failure of heating circuit 12a. At point 58, temperature controller 14a fails in a stuck on condition. From point 58 to point 60, heating circuit 12a continues to provide heat, raising the temperature of the region, despite the temperature exceeding the upper limit of temperature control range 50a. At point 60, both thermal cutoffs 16a and 16b are open cutting off power to heating elements 20a and 20b in response to the temperature reaching thermal cutoff temperature 48. From point 60 to point 62, the temperature drops past temperature control ranges 50a and 50b because both thermal cutoffs 16a and 16b are open preventing power from being supplied to heating elements 20a and 20b, which prevents heating circuits 12a and 12b from providing heat to the region. At point 62, the temperature of the region has fallen to the local ambient value. This can cause damage to the region and/or render it inoperative.

Figure 2B:
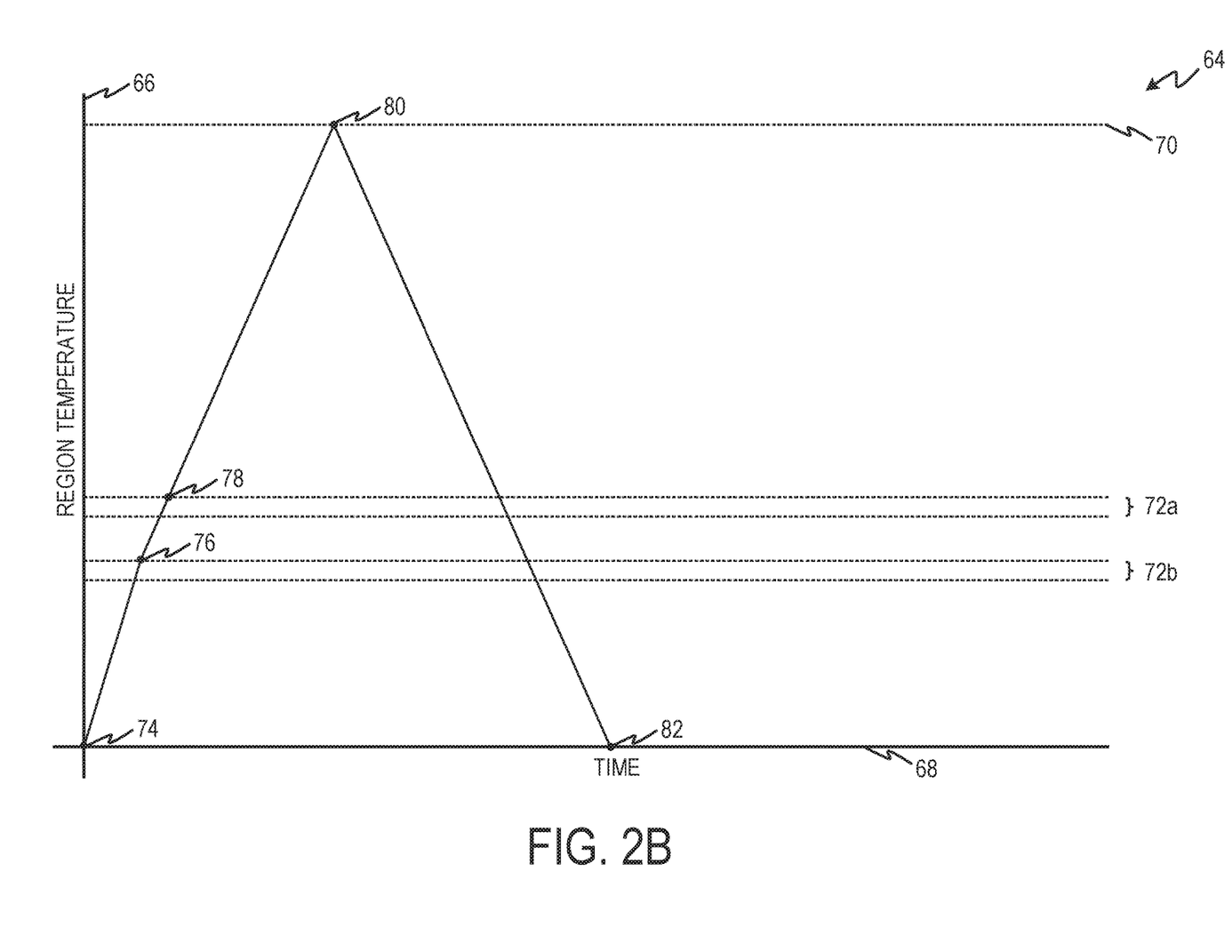
FIG. 2B is a graph illustrating another example of a stuck on failure of the redundant heating system known in the prior art.

FIG. 2B is graph 64 illustrating a temperature of a region over time when heating circuit 12b of redundant heating system 10 fails in a stuck on condition. Graph 64 plots temperature on y-axis 66 and time on x-axis 68. Graph 64 includes thermal cutoff temperature 70, temperature control range 72a corresponding to heating circuit 12a, temperature control range 72b corresponding to heating circuit 12b, and points 74-82.

From point 74 to point 76, the temperature of the region proceeds normally as previously described for FIG. 2. At point 74, power is applied to heating circuits 12a and 12b. From point 74 to point 76, both heating circuits are on. Temperature controllers 14a and 14b are providing power to heating elements 20a and 20b causing heating circuits 12a and 12b to provide heat that raises the temperature of the region.

Points 76, 78, 80, and 82 illustrate the temperature of the region over time during a stuck on failure of temperature controller 12b. At point 76, temperature controller 14b fails in a stuck on condition causing heating circuit 12b to continue providing heat to the region despite the temperature reaching the upper limit of temperature control range 72b. From point 76 to point 78, both heating circuits 12a and 12b provide heat to the region. At point 78, temperature controller 14a ceases providing power to heating element 20a in response to the temperature reaching the upper limit of temperature control range 72a. From point 78 to point 80, heating circuit 12b continues to provide heat to the region until the temperature reaches thermal cutoff temperature 70. At point 80, both thermal cutoffs 16a and 16b are open in response to the temperature reaching thermal cutoff temperature 70. From point 80 to point 82, the temperature drops past temperature control ranges 72a and 72b because both thermal cutoffs 16a and 16b are open preventing power from being supplied to heating elements 20a and 20b which prevents heating circuits 12a and 12b from providing heat to the region. At point 82, the temperature of the region has fallen to the local ambient value. This can cause damage to the region and/or render it inoperative.

Figure 3:
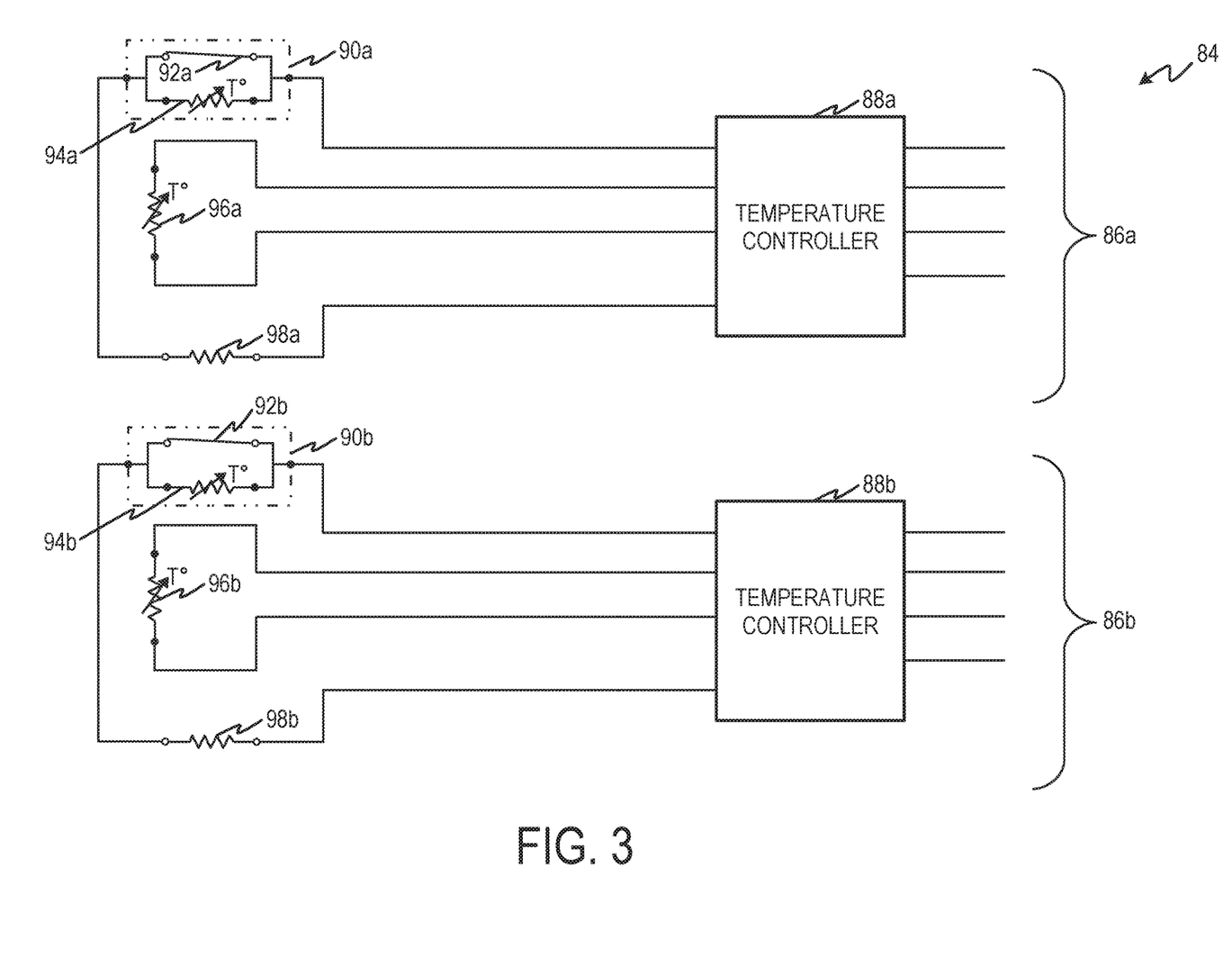
FIG. 3 is a schematic diagram of a redundant heating system according to an embodiment of the present invention.

FIG. 3 is a schematic diagram of a redundant heating system 84 including circuits 86a and 86b. Heating circuits 86a and 86b include temperature controllers 88a and 88b, latching thermostats 90a and 90b, latches 92a and 92b, thermistors 94a and 94b, temperature sensors 96a and 96b, heating elements 98a and 98b, respectively. Latching thermostats 90a and 90b include temperature responsive latches 92a and 92b, and thermistors 94a and 94b respectively.

Heating circuit 86a is configured to heat and maintain a temperature of a region within a temperature range. In some examples, the region is a region of an aircraft, such as a drain mast. Temperature controller 88a receives a command signal indicating the temperature range to be maintained. Temperature controller 88a receives a sensor signal from temperature sensor 96a. Temperature sensor 96a senses the temperature of the region and provides the sensor signal to temperature controller 88a. The sensor signal corresponds to the sensed temperature of the region. Temperature controller 88a determines if the sensed temperature is below a lower limit of the temperature range using the sensor signal and the received temperature range. Temperature controller 88a is configured to begin providing power to heating element 98a when the temperature is at or below the lower limit of the temperature range. Temperature controller 88a is configured to cease providing power to heating element 98a when the sensed temperature is at or above an upper limit of the temperature range.

Heating circuit 86a includes latching thermostat 90a in series with heating element 98a for overheat protection. Latching thermostat 90a is configured to have two different states. In a first state, latch 92 of latching thermostat 90a is closed providing a direct power path from temperature controller 88a to heating element 98a. Latching thermostat 90a is configured to remain in the first state until a temperature of latching thermostat 90a reaches a latch open threshold temperature. The latch open threshold temperature can be the same temperature as the thermal cutoff temperature of FIGS. 1-2B. In the first state, the temperature of latching thermostat 90a is substantially similar to the temperature of the region; therefore, the temperature of latching thermostat 90a will reach the latch open threshold temperature at substantially the same time the temperature of the region reaches the latch open threshold temperature.

In a second state, latch 92a of latching thermostat 90a is open, diverting power from temperature controller 88a to thermistor 94a. Latching thermostat 90a is configured to switch from the first state to the second state in response to the temperature of latching thermostat 90a reaching the open latch threshold temperature. In the second state, thermistor 94a is configured to have a much higher resistance than heating element 98a. Thus configured, thermistor 94a will consume a majority of the power provided by temperature controller 88a. Thermistor 94a will keep the temperature of latching thermostat 90a above the latch open threshold temperature as long as temperature controller 88a continues to supply power. In the second state, whatever power does reach heating element 98a will not be enough for heating element 98a to provide enough heat to maintain or raise the temperature of the region. Therefore, the temperature of the region will drop while latching thermostat 90a remains in the second state until power is no longer supplied to heating circuit 86a or temperature controller 88a ceased to provide power.

Latching thermostat 90a is configured to switch from the second state to the first state in response to the temperature of latching thermostat 90a falling to a close latch threshold temperature. The close latch threshold temperature is above the temperature range, but below the open latch temperature threshold. Latching thermostat 90a configured as described herein, enables robust overheat protection without being rendered inoperative if another heating circuit of the region fails in a stuck on condition, or the temperature of the region exceeds the open latch threshold temperature for any reason. During a stuck on failure of temperature controller 88a latching thermostat 90a prevents heating circuit 86a from continuing to heat the region beyond the open latch threshold temperature. During a stuck on failure of another heating circuit of the region latching thermostat 90a allows heating circuit 86a to continue operating in response to the temperature of the region falling to the close latch temperature threshold.

Heating circuit 86b is substantially similar to heating circuit 86a. However, heating circuit 86b is configured with a lower temperature range than the temperature range of heating circuit 86a. Heating circuit 86b is a redundant heating circuit configured with the lower temperature range so that it can take over heating and maintaining the temperature of the region should heating circuit 86a fail.

Figure 4:
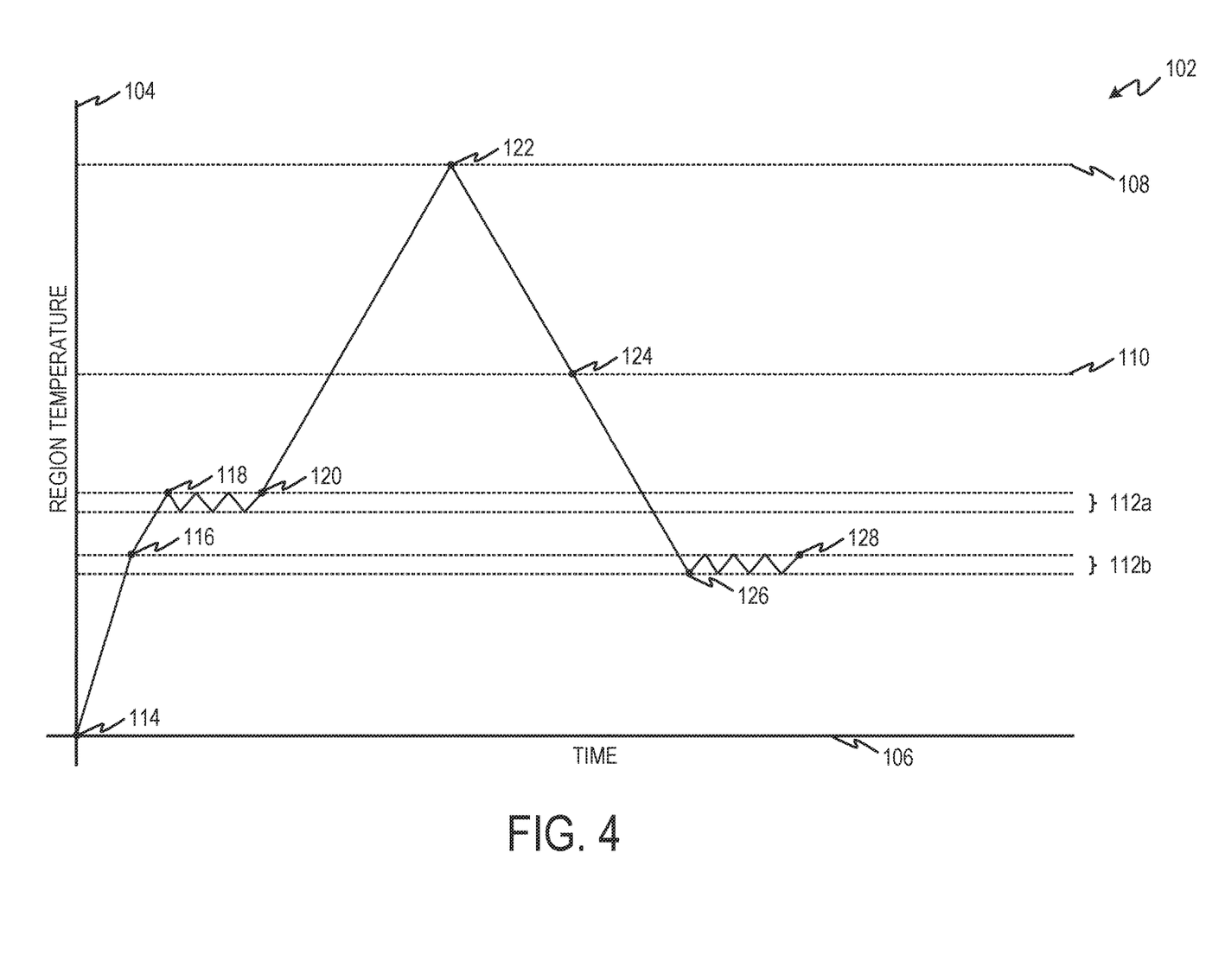
FIG. 4 is a graph illustrating one scenario of a stuck on failure of the redundant heating system of the present invention.

FIG. 4 is a graph 102 illustrating one example of circuit 86a of redundant heating system 84 failing in a stuck on condition. Graph 102 plots temperature on y-axis 104 and time on x-axis 106. Graph 102 includes thermostat open range 108, thermostat close range 110, temperature control range 112a corresponding to heating circuit 86a, temperature control range 112b corresponding to heating circuit 86b, and points 114-128.

From point 114 to point 120, the temperature of the region proceeds normally. At point 114, power is applied to heating circuits 86a and 86b. From point 114 to point 116, both heating circuits are on, temperature controllers 88a and 88b are providing power to heating elements 98a and 98b, and both circuits are providing heat that raises the temperature of the region. At point 116, temperature controller 88b stops providing power to heating element 98b in response to the temperature reaching the upper limit of temperature control range 112b. From point 116 to point 118, heating circuit 86a continues to provide heat that raises the temperature of the region. At point 118, temperature controller 88a stops providing power to heating element 98a in response to the temperature reaching the upper limit of temperature control range 112a. From point 118 to point 120, heating circuit 86a turns on and off to maintain the temperature of the region within temperature control range 112a. Temperature controller 88a ceases to provide power to heating element 98a when the temperature reaches the upper limit of temperature control range 112a, and resumes providing power to heating element 98a when the temperature reaches a lower limit of temperature control range 112a.

From point 120 to point 126 the temperature of the region is driven up due to a stuck on failure of temperature controller 88a followed by the temperature dropping due to latching thermostat 90a switching to the second state. At point 120, temperature controller 88a fails in a stuck on condition. From point 120 to point 122, temperature controller 88a is stuck on and heating circuit 86a continues to provide heat that raises the temperature of the region, despite the temperature exceeding the upper limit of temperature control range 112a. At point 122, latching thermostats 90a and 90b switch to the second state in response to the temperature of the region, and thus the temperature of latching thermostats 90a and 90b, reaching open latch threshold temperature 108. From point 122 to point 124, the temperature drops in response to both latching thermostats 90a and 90b switching to the second state. At point 124, latching thermostat 90b switches back to the first state in response to the temperature of the region, and thus the temperature of latching thermostat 90b, falling to close latch threshold temperature 110. Latching thermostat 90a does not switch back to the first state because the temperature of latching thermostat 90a stays at or above open latch threshold temperature 108 due to heat produced by thermistor 94a caused by the stuck on failure of temperature controller 88a. From point 124 to point 126 the temperature of the region falls to the lower limit of temperature control range 112b because neither heating circuit 86a or 86b are providing heat to the region.

From point 126 to point 128 the temperature of the region again proceeds normally with heating circuit 88b maintaining the temperature of the region. At point 126, temperature controller 86b turns on and temperature controller 88b resumes providing power to heating element 98b. From point 126 to point 128, heating circuit 86b turns on and off to maintain the temperature of the region within temperature control range 112b. Temperature controller 88b ceases to provide power to heating element 98b when the temperature reaches the upper limit of temperature control range 112b, and resumes providing power to heating element 98a when the temperature reaches a lower limit of temperature control range 112b. At point 128, heating circuit 86b continues to maintain the temperature of the region within temperature control range 112b until power to heating circuit 86b ceases.

Figure 5:
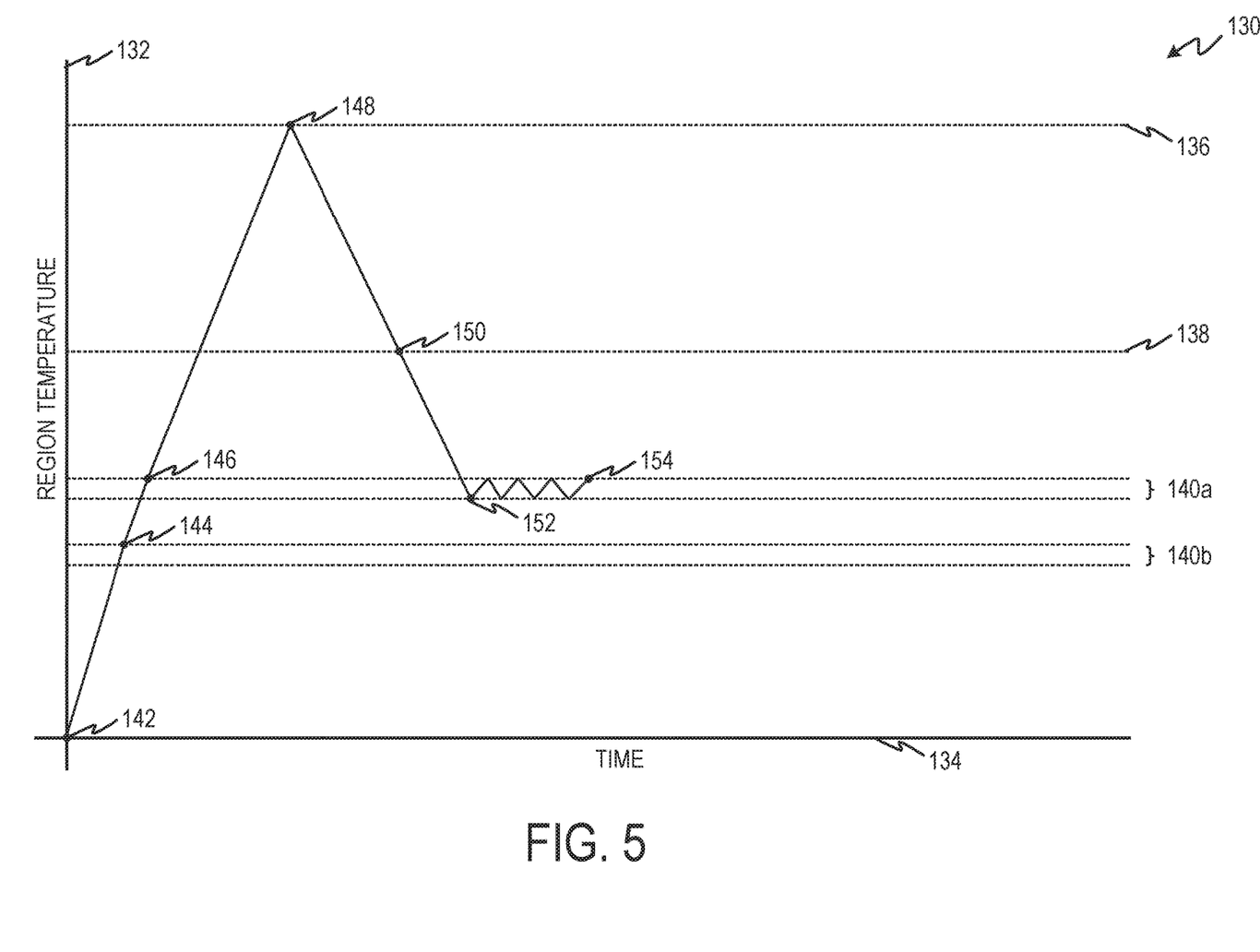
FIG. 5 is a graph illustrating another scenario of a stuck on failure of the redundant heating system of the present invention.

FIG. 5 is a graph 130 illustrating one example of circuit 86b of redundant heating system 52 failing in a stuck on condition. Graph 130 plots temperature on y-axis 132 and time on x-axis 134. Graph 130 includes thermostat open range 136, thermostat close range 138, temperature control range 140a corresponding to heating circuit 86a, temperature control range 140b corresponding to heating circuit 86b, and points 142, 144, 146, 148, 150, 152, and 154.

From point to 142 point 144, the temperature of the region proceeds normally because heating circuits 86a and 86b are operating normally. At point 142, power is applied to heating circuits 86a and 86b. From point 142 to point 144, both heating circuits are on, temperature controllers 88a and 88b are providing power to heating elements 98a and 98b, and both circuits are providing heat that raises the temperature of the region.

From point 144 to point 152 the temperature of the region is driven up due to a stuck on failure of temperature controller 88b followed by the temperature dropping due to latching thermostat 90b switching to the second state. At point 144, temperature controller 88b fails in a stuck on condition. From point 144 to point 146, both heating circuits continue to provide heat that raises the temperature of the region. At point 146, temperature controller 88a stops providing power to heating element 98a in response to the temperature reaching the upper limit of temperature control range 140a. From point 146 to point 148, temperature controller 88b is stuck on and heating circuit 86b continues to provide heat that raises the temperature of the region. At point 148, latching thermostats 90a and 90b switch to the second state in response to the temperature of the region, and thus the temperature of latching thermostats 90a and 90b, reaching open latch threshold temperature 136. From point 148 to point 150, the temperature drops in response to latching thermostat 90b switching to the second state. At point 150, latching thermostat 90a switches to the first state in response to the temperature of the region, and thus the temperature of latching thermostat 90a, falling to close latch threshold temperature 138. Latching thermostat 90b does not switch back to the first state because the temperature of latching thermostat 90b stays at or above open latch threshold temperature 136 due to heat produced by thermistor 94b caused by the stuck on failure of temperature controller 88b. From point 150 to point 152 the temperature of the region falls to the lower limit of temperature control range 140a because neither heating circuit 86a or 86b are providing heat to the region.

From point 152 to 154 the temperature of the region again proceeds normally with heating circuit 88a maintaining the temperature of the region. At point 152, temperature controller 86a turns on and temperature controller 88a resumes providing power to heating element 98a. From point 152 to point 154, heating circuit 86a maintains the temperature of the region within temperature control range 80a by temperature controller 88a ceasing to provide power to heating element 98a when the temperature reaches the upper limit of temperature control range 140a and resumes providing power to heating element 98a when the temperature reaches a lower limit of temperature control range 140a. At point 154, heating circuit 86a continues to maintain the temperature of the region within temperature control range 80a until power to heating circuit 86a ceases.

Accordingly, redundant heating system 84 as described herein enables overheat protection without sacrificing operability of either heating circuits 86a and 86b. Redundant heating systems employing heating circuits substantially similar to heating circuits 86a and 86b will enable the same benefits. Heating circuits that fail in a stuck on condition are rendered inoperative by their respective latching thermostat, but heating circuits that have not failed will continue to operate normally once the temperature falls below the close latch threshold temperature. Thus reaching the open latch threshold temperature will not render all heating circuits of the redundant heating system inoperative.

Discussion of Possible Embodiments

The following are non-exclusive descriptions of possible embodiments of the present invention.

A redundant heating system comprising a plurality of heating circuits configured to heat a region, each heating circuit comprising a temperature sensor configured to sense a temperature of the region; a heating element; a temperature controller configured to provide power to the heating element based on the sensed temperature of the region; and a latching thermostat in series with the heating element, the latching thermostat configured to consume power supplied by the temperature controller to the heating element in response to a temperature of the latching thermostat reaching an open latch threshold temperature.

The redundant heating system of the preceding paragraph can optionally include, additionally and/or alternatively, any one or more of the following features, configurations and/or additional components:

Each of the plurality of heating circuits can be configured to maintain the temperature of the region within a different temperature range.

The latching thermostat can comprise a temperature responsive latch; and a thermistor in parallel with the temperature responsive latch.

The latching thermostat can be configured to have a first state and a second state; the temperature responsive latch can be closed, causing a current from the temperature controller to bypass the thermistor in the first state; and the temperature responsive latch can be open, diverting the current from the temperature controller to the thermistor in the second state.

The latching thermostat can be configured to switch from the first state to the second state in response to the temperature of the latching thermostat rising to the open latch threshold temperature.

The latching thermostat can be configured to switch from the second state to the first state in response to the temperature of the latching thermostat falling to a close latch threshold temperature.

The open latch threshold temperature can be higher than the temperature range.

The close latch threshold temperature can be lower than the open latch threshold temperature and higher than the temperature range.

The region can be a drain mast of an aircraft.

The temperature controller can be configured to cease providing power to the heating element in response to the sensed temperature reaching an upper limit of a temperature range.

A method comprising sensing a temperature of a region using a plurality of temperature sensors; providing power, using at least one temperature controller, to at least one heating element based on the sensed temperature of the region; and consuming power provided by the at least one temperature controller using at least one latching thermostat, in response to a temperature of the latching thermostat reaching an open latch threshold temperature.

The method of the preceding paragraph can optionally include, additionally and/or alternatively, any one or more of the following features, configurations and/or additional components:

Each of the at least one temperature controller can be configured to maintain the temperature of the region within a different temperature range.

The at least one latching thermostat can comprise a temperature responsive latch; and a thermistor in parallel with the temperature responsive latch.

Switching the at least one latching thermostat from a first state to a second state can be in response to the temperature of the latching thermostat rising to the open latch temperature.

The temperature responsive latch can be closed, causing a current from the temperature controller to bypass the thermistor in the first state; and the temperature responsive latch can be open, diverting the current from the temperature controller to the thermistor in the second state.

Switching the at least one latching thermostat from the second state to the first state can be in response to the temperature of the at least one latching thermostat falling to a close latch threshold temperature.

The open latch threshold temperature can be higher than the temperature range.

The close latch threshold temperature can be lower than the open latch threshold temperature and higher than the temperature range.

The region can be a drain mast of an aircraft.

Ceasing to provide power, using the at least one temperature controller, to the at least one heating element can be in response to the sensed temperature reaching an upper limit of a temperature range.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A redundant heating system comprising:
a plurality of heating circuits configured to heat a region, each heating circuit comprising:
   a temperature sensor configured to sense a temperature of the region;
   a heating element;
   a temperature controller configured to provide power to the heating element based on the sensed temperature of the region; and
   a latching thermostat in series with the heating element, the latching thermostat configured to consume the power supplied by the temperature controller to the heating element in response to a temperature of the latching thermostat reaching an open latch threshold temperature;
   wherein the latching thermostat comprises:
      a temperature responsive latch; and
      a thermistor in parallel with the temperature responsive latch;
   wherein the latching thermostat is configured to have a first state and a second state;
   wherein the temperature responsive latch is closed, causing a current from the temperature controller to bypass the thermistor in the first state; and
   wherein the temperature responsive latch is open, diverting the current from the temperature controller to the thermistor in the second state; and
wherein each of the plurality of heating circuits is configured to maintain the temperature of the region within a different temperature range.

2. The redundant heating system of claim 1, wherein the latching thermostat is configured to switch from the first state to the second state in response to the temperature of the latching thermostat rising to the open latch threshold temperature.

3. The redundant heating system of claim 2, wherein the latching thermostat is configured to switch from the second state to the first state in response to the temperature of the latching thermostat falling to a close latch threshold temperature.

4. The redundant heating system of claim 3, wherein the open latch threshold temperature is higher than the temperature range.

5. The redundant heating system of claim 4, wherein the close latch threshold temperature is lower than the open latch threshold temperature and higher than the temperature range.

6. The redundant heating system of claim 1, wherein the region is a drain mast of an aircraft.

7. The redundant heating system of claim 1, wherein the temperature controller is configured to cease providing the power to the heating element in response to the sensed temperature reaching an upper limit of the temperature range.

* * * * *